US012810631B2

(12) United States Patent
Iwase et al.

(10) Patent No.: US 12,810,631 B2
(45) Date of Patent: Nov. 24, 2026

(54) MULTI-OBJECT 3D SHAPE COMPLETION IN THE WILD FROM A SINGLE RGB-D IMAGE VIA LATENT 3D OctMAE

(71) Applicants: TOYOTA RESEARCH INSTITUTE, INC., Los Altos, CA (US); CARNEGIE MELLON UNIVERSITY, Pittsburgh, PA (US)

(72) Inventors: Shun Iwase, Pittsburgh, PA (US); Sergey Zakharov, San Francisco, CA (US); Katherine Liu, Mountain View, CA (US); Vitor Campagnolo Guizilini, Santa Clara, CA (US); Adrien David Gaidon, Mountain View, CA (US); Kris Makoto Kitani, Pittsburgh, PA (US); Rares Andrei Ambrus, San Francisco, CA (US)

(73) Assignees: TOYOTA RESEARCH INSTITUTE, INC., Los Altos, CA (US); TOYOTA JIDOSHA KABUSHIKI KAISHA, Aichi-Ken (JP); CARNEGIE MELLON UNIVERSITY, Pittsburgh, PA (US)

( * ) Notice: Subject to any disclaimer, the term of this patent is extended or adjusted under 35 U.S.C. 154(b) by 131 days.

(21) Appl. No.: 18/920,782

(22) Filed: Oct. 18, 2024

(65) Prior Publication Data

US 2025/0296238 A1 Sep. 25, 2025

Related U.S. Application Data

(60) Provisional application No. 63/567,142, filed on Mar. 19, 2024, provisional application No. 63/554,829, filed on Feb. 16, 2024.

(51) Int. Cl.
*G06V 20/64* (2022.01)
*G06T 17/00* (2006.01)

(52) U.S. Cl.
CPC .............. *G06V 20/64* (2022.01); *G06T 17/00* (2013.01); *G06T 17/005* (2013.01)

(58) Field of Classification Search
CPC .............................. G06V 20/64; G06T 17/005
See application file for complete search history.

(56) References Cited

U.S. PATENT DOCUMENTS 11,450,066 B2 9/2022 Kong et al.
11,694,356 B2 7/2023 Goforth et al.
(Continued)

OTHER PUBLICATIONS

Tatarchenko; Maxim, "Octree Generating Networks: Efficient Convolutional Architectures for High-resolution 3D Outputs", Aug. 7, 2017, arXiv, pp. 2, 3, 8 (Year: 2017).*
(Continued)

*Primary Examiner* — Kee M Tung
*Assistant Examiner* — Alicia Ha
(74) *Attorney, Agent, or Firm* — SEYFARTH SHAW LLP

(57) ABSTRACT

A method for 3D object shape completion is described. The method includes unprojecting an encoded image feature to obtain an octree feature F. The method also includes generating, by a latent 3D masked autoencoder (MAE) encoder using an input encoded octree feature F, an output latent octree feature $F_L$. The method further includes computing, by a latent 3D MAE decoder using the output latent octree $F_L$ and octree mask tokens T, a latent mixed octree feature $F_{ML}$. The method also includes predicting, by an octree decoder from the latent mixed octree feature $F_{ML}$, a completed 3D shape.

14 Claims, 9 Drawing Sheets

(56) References Cited

U.S. PATENT DOCUMENTS

| | | | |
|---|---|---|---|
| 2021/0150751 A1 | 5/2021 | Liu et al. | |
| 2022/0067983 A1 | 3/2022 | Fidler et al. | |
| 2022/0414974 A1 | 12/2022 | Zakharov et al. | |
| 2023/0124868 A1 | 4/2023 | Kayser et al. | |
| 2024/0091950 A1 * | 3/2024 | Hong | G06T 5/50 |

OTHER PUBLICATIONS

Wu; Jiajun, "MarrNet: 3D Shape Reconstruction via 2.5D Sketches", Nov. 8, 2017, NeurIPS, p. 3, 9 (Year: 2017).*
Wang; Peng-Shuai, "O-CNN: Octree-based Convolutional Neural Networks for 3D Shape Analysis", Dec. 5, 2017, arXiv, pp. 1, 2 (Year: 2017).*
Wang; Peng-Shuai, "Deep Octree-based CNNs with Output-Guided Skip Connections for 3D Shape and Scene Completion", Jun. 2020, CVF, pp. 1, 2 (Year: 2020).*
Jiang; Jincen, "Masked Autoencoders in 3D Point Cloud Representation Learning", Sep. 11, 2023, arXiv, pp. 4, 5 (Year: 2023).*
Li, et al., "RGBD Based Dimensional Decomposition Residual Network for 3D Semantic Scene Completion," arXiv:1903.00620v2 [cs.CV], May 1, 2019.
Li, et al., "VoxFormer: Sparse Voxel Transformer for Camera-based 3D Semantic Scene Completion," arXiv:2302.12251v2 [cs.CV], Mar. 25, 2023.
Gao, et al., "ConvMAE: Masked Convolution Meets Masked Autoencoders," arXiv:2205.03892v2 [cs.CV], May 19, 2022.
Gu, et al., "Weakly-supervised 3D Shape Completion in the Wild," arXiv:2008.09110v1 [cs.CV], Aug. 20, 2020.
Jiang et al., "P2M2-Net Part-Aware Prompt-Guided Multimodal Point Cloud Completion," arXiv:2312.17611v1 [cs.CV], Dec. 29, 2023.
Li et al., "Anisotropic Convolutional Networks for 3D Semantic Scene Completion," arXiv:2004.02122v1 [cs.CV], Apr. 5, 2020.
Wang et al., "O-CNN Octree-based Convolutional Neural Networks for 3D Shape Analysis," arXiv:1712.01537v1 [cs.CV], Dec. 5, 2017.
Zhang et al., "Cascaded Context Pyramid for Full-Resolution 3D Semantic Scene Completion," arXiv:1908.00382v1 8 [cs.CV], Aug. 1, 2019.

* cited by examiner

MULTI-OBJECT 3D SHAPE COMPLETION IN THE WILD FROM A SINGLE RGB-D IMAGE VIA LATENT 3D OctMAE

CROSS-REFERENCE TO RELATED APPLICATIONS

The present application claims the benefit of U.S. Provisional Patent Application No. 63/567,142, filed Mar. 19, 2024, and titled "MULTI-OBJECT 3D SHAPE COMPLETION IN THE WILD FROM A SINGLE RGB-D IMAGE VIA LATENT 3D OCTMAE," and U.S. Provisional Patent Application No. 63/554,829, filed Feb. 16, 2024, and titled "MULTI-OBJECT 3D SHAPE COMPLETION IN THE WILD FROM A SINGLE RGB-D IMAGE VIA SPARSE 3D CONVMAE," the disclosures of which are expressly incorporated by reference herein in their entireties.

BACKGROUND

Field

Certain aspects of the present disclosure relate to machine learning and, more particularly, multi-object 3D shape completion in the wild from a single RGB-D image via latent 3D octree masked autoencoder (OctMAE).

Background

Autonomous agents (e.g., robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

Humans can instantly imagine complete shapes of multiple novel objects in a cluttered scene via advanced geometric and semantic reasoning. This ability is also essential for robots if they are to effectively perform useful tasks in the real world. A method for quickly and accurately reconstructing a wide number of objects in diverse, real-world scenes, is desired.

SUMMARY

A method for 3D object shape completion is described. The method includes unprojecting an encoded image feature to obtain an octree feature F. The method also includes generating, by a latent 3D masked autoencoder (MAE) encoder using an input encoded octree feature F, an output latent octree feature $F_L$. The method further includes computing, by a latent 3D MAE decoder using the output latent octree $F_L$ and octree mask tokens T, a latent mixed octree feature $F_{ML}$. The method also includes predicting, by an octree decoder from the latent mixed octree feature $F_{ML}$, a completed 3D shape.

A non-transitory computer-readable medium having program code recorded thereon for 3D object shape completion is described. The program code is executed by a processor. The non-transitory computer-readable medium includes program code to unproject an encoded image feature to obtain an octree feature F. The non-transitory computer-readable medium also includes program code to generate, by a latent 3D masked autoencoder (MAE) encoder using an input encoded octree feature F, an output latent octree feature $F_L$. The non-transitory computer-readable medium further includes program code to compute, by a latent 3D MAE decoder using the output latent octree $F_L$ and octree mask tokens T, a latent mixed octree feature $F_{ML}$. The non-transitory computer-readable medium also includes program code to predicting, by an octree decoder from the latent mixed octree feature $F_{ML}$, a completed 3D shape.

A system for 3D object shape completion is described. The system includes an unprojection module to unproject an encoded image feature to obtain an octree feature F. The system also includes a latent 3D masked autoencoder (MAE) encoder to generate, using an input encoded octree feature F, an output latent octree feature $F_L$. The system further includes a latent 3D MAE decoder to compute, using the output latent octree $F_L$ and octree mask tokens T, a latent mixed octree feature $F_{ML}$. The system also includes an octree decoder to predict, from the latent mixed octree feature $F_{ML}$, a completed 3D shape.

This has outlined, broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
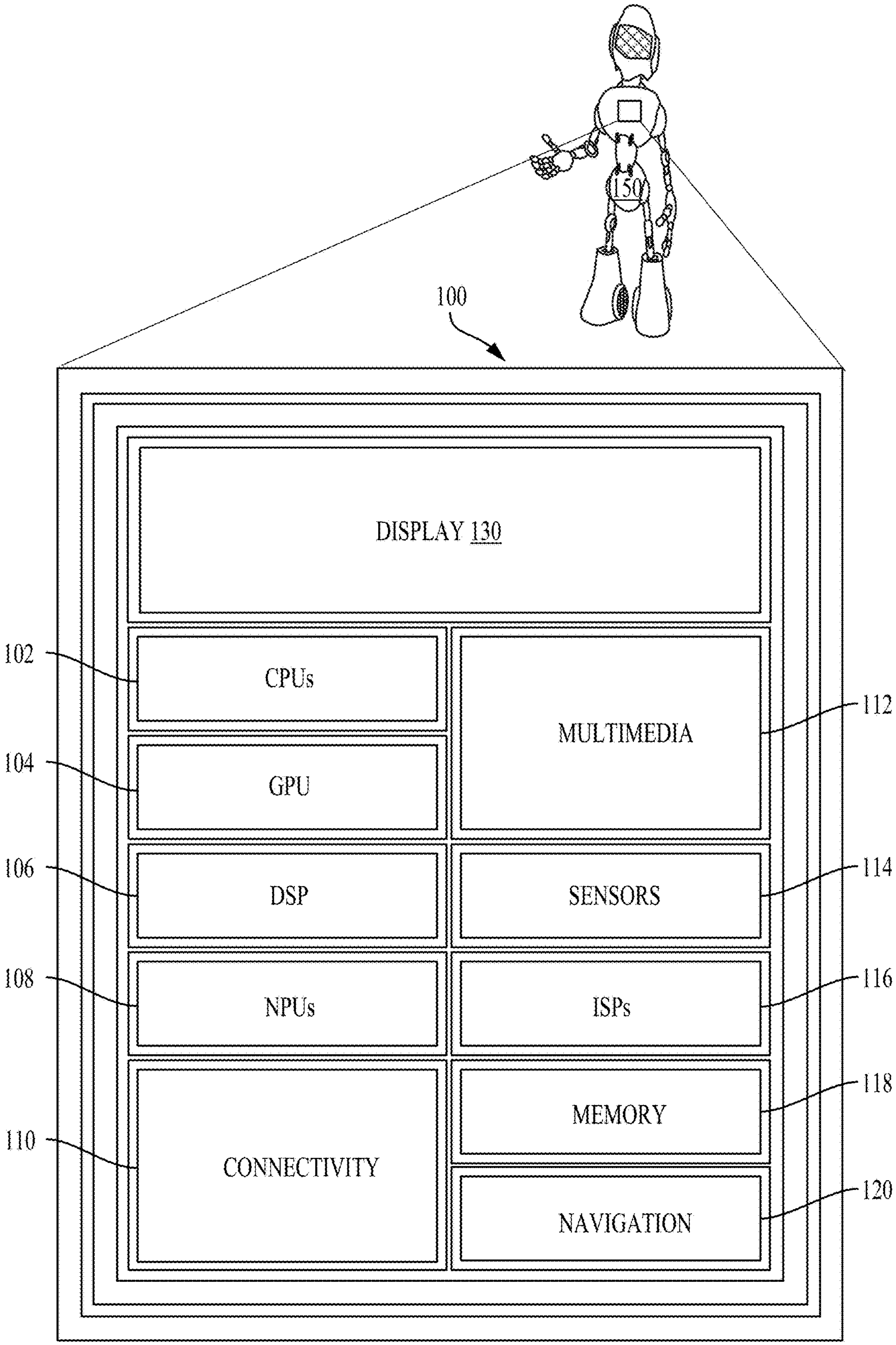
FIG. 1 illustrates an example implementation of designing a system using a system-on-a-chip (SOC) for multi-object 3D shape completion, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. Any aspect of the present disclosure disclosed may be embodied by one or more elements of a claim.

Although aspects are described herein, many variations and permutations of these aspects fall within the scope of the present disclosure. Although some benefits and advantages of the preferred aspects are mentioned, the scope of the present disclosure is not intended to be limited to benefits, uses, or objectives. Rather, aspects of the present disclosure are intended to be universally applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents (e.g., robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene.

In practice, machine vision strives to provide a high-level understanding of a surrounding environment, as performed by the human visual system. Humans can instantly imagine complete shapes of multiple novel objects in a cluttered scene via advanced geo-metric and semantic reasoning. This ability is also essential for robots if they are to effectively perform useful tasks in the real world. A method for quickly and accurately reconstructing a wide number of objects in diverse, real-world scenes, is desired.

Conventional solutions have achieved progress in scene and object shape completion from a single RGB-D image. Object-centric methods achieve reconstruction accuracy by relying on category-specific shape priors. Unfortunately, when deployed on entire scenes, these object-centric methods specify bespoke detectors and often perform test-time optimization, which is time consuming and hinders real-time deployment on a robot. Moreover, existing methods are typically limited to a small set of categories. Thus, generalizable 3D re-construction in the wild remains a challenging and open problem that has seen little success to date.

Various aspects of the present disclosure propose a shape completion algorithm at the scene level that generalizes across many shapes based on an input of an RGB-D image and a foreground mask. In various aspects of the present disclosure, the proposed method involves Octree masked autoencoders (OctMAE). As described, an OctMAE refers to a hybrid architecture of Octree U-Net and a latent 3D MAE. Although the MAE architecture memory utilization is still prohibitive to manage a higher resolution voxel grid, various aspects of the present disclosure address this issue by integrating a sparse 3D MAE into the latent space of Octree U-Net. Various aspects of the present disclosure recognize that the latent 3D MAE is an important feature to global structure understanding and leads to robust performance and generalization across all datasets. Moreover, various aspects of the present disclosure demonstrate the importance of a masking strategy and 3D positional embeddings for achieving improved performance.

FIG. 1 illustrates an example implementation of the system and method for multi-object 3D shape completion using a system-on-a-chip (SOC) 100 of a robot 150. The SOC 100 may include a single processor or multi-core processors (e.g., a central processing unit), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include sixth generation (6G) connectivity, sixth generation (6G) new radio (NR) connectivity, fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a robot. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on a reduced instruction set computing (RISC) machine, RISC-V, an advanced RISC machine (ARM), a microprocessor, or any reduced instruction set computing (RISC) architecture. The CPU 102 may be based on an ARM instruction set. In another aspect of the present disclosure, the SOC 100 may be a server computer in communication with the robot 150. In this arrangement, the robot 150 may include a processor and other features of the SOC 100. In this aspect of the present disclosure, instructions loaded into a processor (e.g., CPU 102) or the NPU 108 of the robot 150 may include code for fusing neural radiance fields (NeRFs) by registration and blending in a NeRF fusion framework from images captured by the sensor processor 114. the NPU 108 of the robot 150 may include code for fusing neural radiance fields (NeRFs) utilizing truncated signed distance functions (TSDF). The instructions loaded into a processor (e.g., CPU 102) may also include code for planning and control (e.g., of the robot 150) in response to multi-object 3D shape completion of objects from images captured by the sensor processor 114.

The instructions loaded into a processor (e.g., CPU 102) may also include code to unproject an encoded image feature to obtain an octree feature F. The instructions loaded into a processor (e.g., CPU 102) may also include code to encode the octree feature F using an octree encoder. The instructions loaded into a processor (e.g., CPU 102) may further include code to generate, by a sparse 3D MAE encoder using an input encoded feature F, an output feature FME concatenated with sparse mask tokens T. The instructions loaded into a processor (e.g., CPU 102) may also include code to compute, by a sparse 3D MAE decoder using the output feature FME concatenated with sparse mask tokens T, a masked decoded feature $F_{MD}$. The instructions loaded into a processor (e.g., CPU 102) may also include code to predict, by an octree decoder from the masked decoded feature $F_{MD}$, a completed 3D shape.

Figure 2:
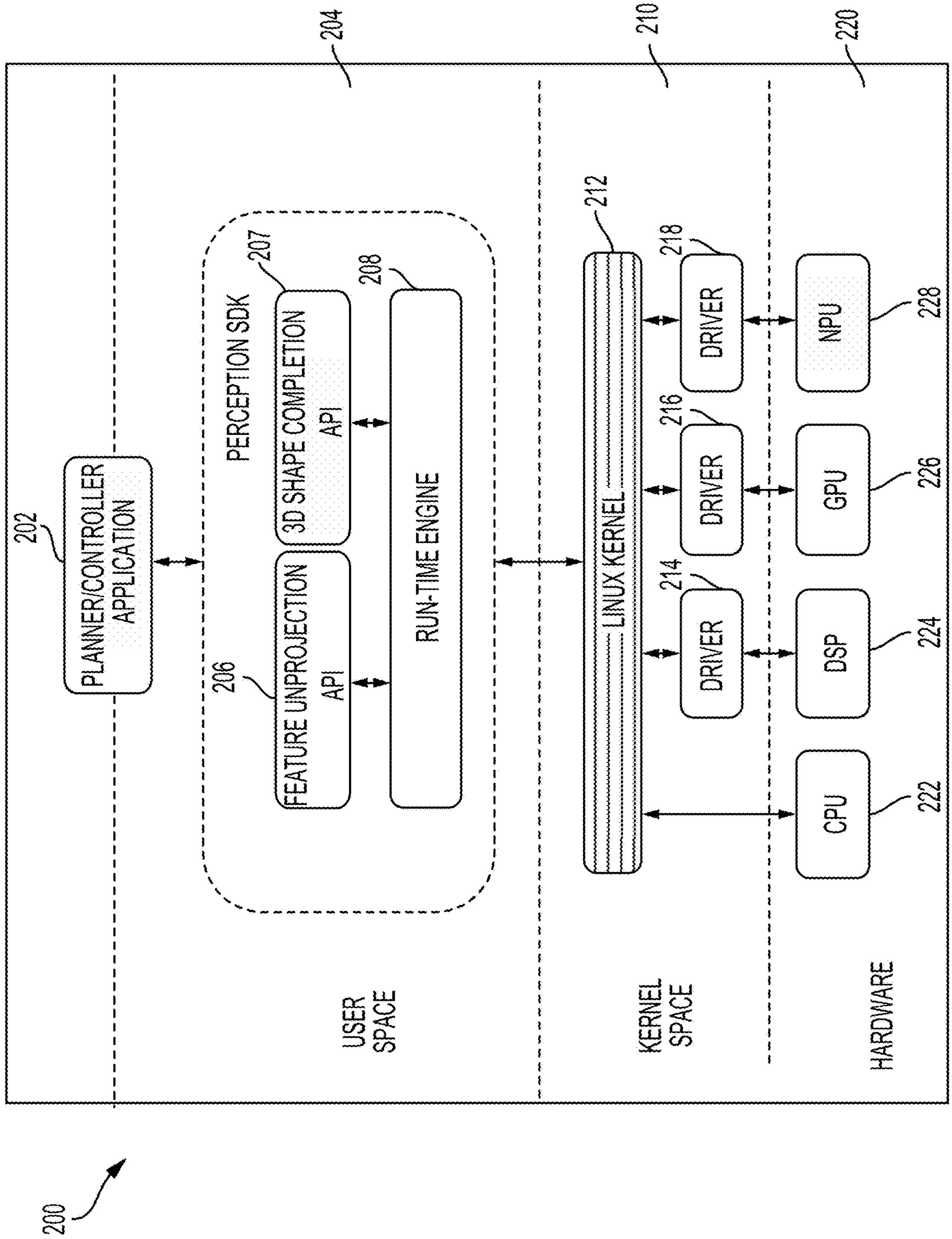
FIG. 2 is a block diagram illustrating a software architecture for multi-object 3D shape completion in the wild, according to aspects of the present disclosure.

FIG. 2 is a block diagram illustrating a software architecture 200 for multi-object 3D shape completion in the wild, according to aspects of the present disclosure. Using the software architecture 200, a planner/controller application 202 may be designed such that it may cause various processing blocks of an SOC 220 (for example a CPU 222, a DSP 224, a GPU 226, and/or an NPU 228) to perform supporting computations during run-time operation of the planner/controller application 202.

The planner/controller application 202 may be configured to call functions defined in a user space 204 that may, for example, utilize a completed 3D shape. Various aspects of the present disclosure propose a shape completion algorithm at the scene level that generalizes across many shapes based on an input of an RGB-D image and a foreground mask. In various aspects of the present disclosure, the proposed method involves Octree masked autoencoders (OctMAE).

In various aspects of the present disclosure, the planner/controller application 202 may make a request to compile program code associated with a library defined in a feature unprojection application programming interface (API) 206 to unproject an encoded image feature to obtain an octree feature F. The feature unprojection API 206 may also generate, by a latent 3D MAE encoder using an input encoded octree feature F, an output latent octree feature $F_L$. A 3D shape completion API 207 may compute, by a latent 3D MAE decoder using the output latent octree feature $F_L$ and octree mask tokens T, a latent mixed octree feature $F_{ML}$. Additionally, the 3D shape completion API 207 may predict, by an octree decoder from the latent mixed octree feature $F_{ML}$, a completed 3D shape.

A run-time engine 208, which may be compiled code of a runtime framework, may be further accessible to the planner/controller application 202. The planner/controller application 202 may cause the run-time engine 208, for example, to perform object manipulation utilizing completed 3D shapes representing objects. When an object is detected within a predetermined distance of the robot, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228 if present.

Figure 3:
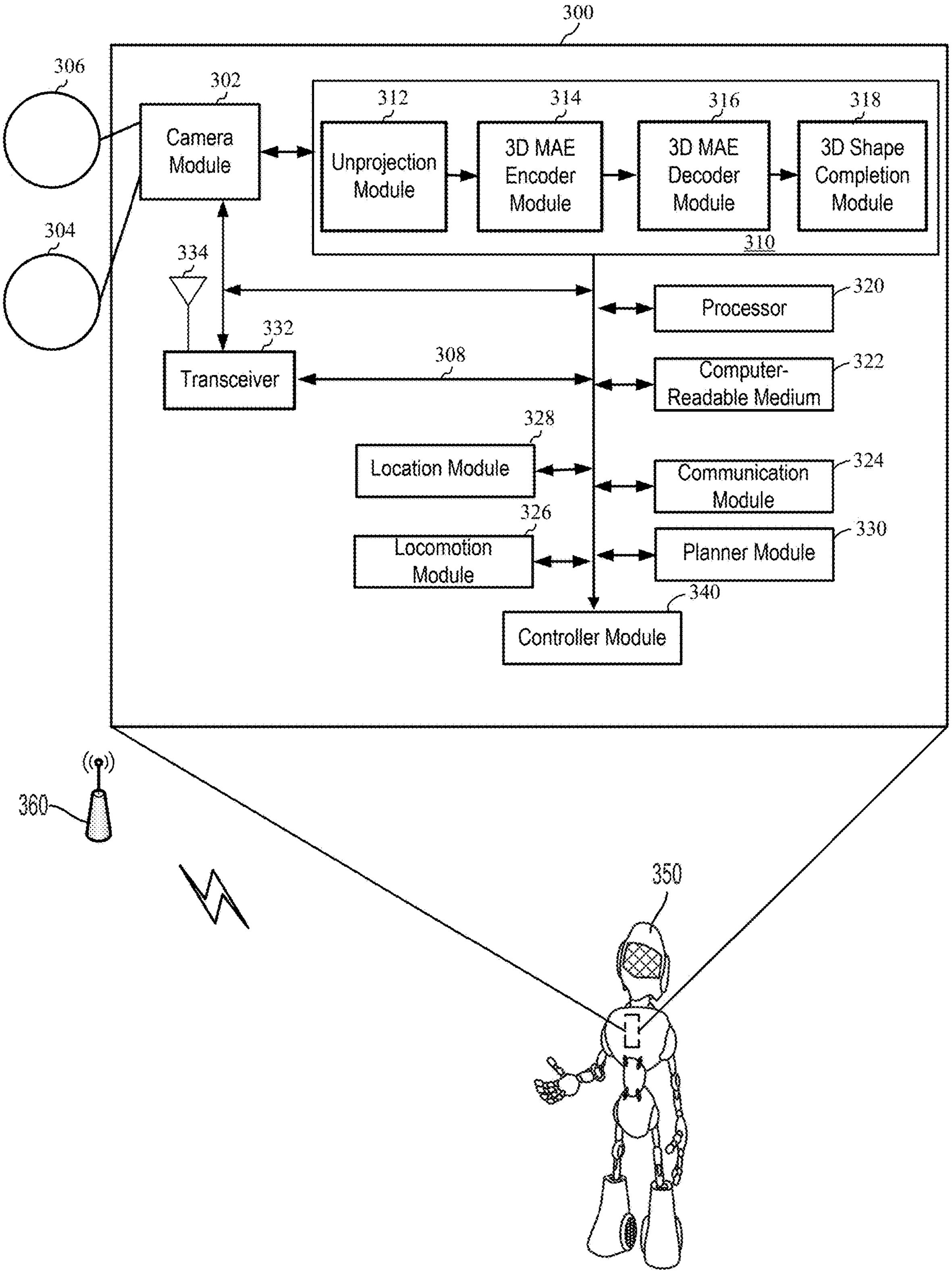
FIG. 3 is a diagram illustrating an example of a hardware implementation of a multi-object 3D shape completion system, according to various aspects of the present disclosure.

FIG. 3 is a diagram illustrating an example of a hardware implementation of a multi-object 3D shape completion system 300, according to various aspects of the present disclosure. The multi-object 3D shape completion system 300 may be configured for completing a 3D object in a scene to enable planning and controlling a robot in response to images from video captured through a camera during operation of a robot 350. The multi-object 3D shape completion system 300 may be a component of a robotic or other autonomous device. For example, as shown in FIG. 3, the multi-object 3D shape completion system 300 is a component of the robot 350. Aspects of the present disclosure are not limited to the multi-object 3D shape completion system 300 being a component of the robot 350, as other devices, such as an autonomous vehicle, a bus, a motorcycle, or other like autonomous vehicles, are also contemplated for using the multi-object 3D shape completion system 300. The robot 350 may be autonomous or semi-autonomous.

The multi-object 3D shape completion system 300 may be implemented with an interconnected architecture, such as a controller area network (CAN) bus, represented by an interconnect 308. The interconnect 308 may include any number of point-to-point interconnects, buses, and/or bridges depending on the specific application of the multi-object 3D shape completion system 300 and the overall design constraints of the robot 350. The interconnect 308 links together various circuits, including one or more processors and/or hardware modules, represented by a camera module 302, a perception module 310, a processor 320, a computer-readable medium 322, a communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The multi-object 3D shape completion system 300 includes a transceiver 332 coupled to the camera module 302, the perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the robot 350. As another example, the transceiver 332 may transmit completed 3D object shapes within a video and/or planned actions from the perception module 310 to a server (not shown).

The multi-object 3D shape completion system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the multi-object 3D shape completion system 300 to perform the various functions described for robotic perception of completed 3D object shapes from scenes in video captured by a camera of an autonomous agent, such as the robot 350, or any of the modules (e.g., 302, 310, 324, 326, 328, 330, and/or 340). The computer-readable medium 322 may also be used for storing data that is manipulated by the processor 320 when executing the software.

The camera module 302 may obtain images via different cameras, such as a first camera 304 and a second camera 306. The first camera 304 and the second camera 306 may be a vision sensor (e.g., a stereoscopic camera or a red-green-blue (RGB) camera) for capturing 2D RGB images. Alternatively, the camera module may be coupled to a ranging sensor, such as a light detection and ranging (LIDAR) sensor or a radio detection and ranging (RADAR) sensor. Of course, aspects of the present disclosure are not limited to the sensors, as other types of sensors (e.g., thermal, sonar, and/or lasers) are also contemplated for either of the first camera 304 or the second camera 306.

The images of the first camera 304 and/or the second camera 306 may be processed by the processor 320, the camera module 302, the perception module 310, the communication module 324, the locomotion module 326, the location module 328, and the controller module 340. In conjunction with the computer-readable medium 322, the images from the first camera 304 and/or the second camera 306 are processed to implement the functionality described herein. In one configuration, detected 2D object information captured by the first camera 304 and/or the second camera 306 may be transmitted via the transceiver 332. The first camera 304 and the second camera 306 may be coupled to the robot 350 or may be in communication with the robot 350.

Despite notable advancements in single object 3D shape completion, high-quality reconstructions in cluttered multi-object scenes remain a challenge. Various aspects of the present disclosure propose solutions involving the multi-object 3D shape completion system 300 that recovers the complete geometry of multiple objects in complex scenes from a single RGB-D image. Additionally, the multi-object 3D shape completion system 300 leverages occlusions derived from the input depth to compute enhanced geometry-aware features combined with image-level semantic features. A self-attention mechanism aggregates the sparse information while effectively preserving the global scene context and allows for efficient and accurate shape completion. The multi-object 3D shape completion system 300 demonstrates improved performance over the current state-of-the-art on the proposed synthetic and real-world reconstruction benchmark and when operating on real-world data.

The location module 328 may determine a location of the robot 350. For example, the location module 328 may use a global positioning system (GPS) to determine the location of the robot 350. The location module 328 may implement a dedicated short-range communication (DSRC)-compliant GPS unit. A DSRC-compliant GPS unit includes hardware and software to make the robot 350 and/or the location module 328 compliant with one or more of the following DSRC standards, including any derivative or fork thereof: EN 12253:2004 Dedicated Short-Range Communication-Physical layer using microwave at 5.9 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); EN 13372:2004 Dedicated Short-Range Communication (DSRC)-DSRC profiles for RTTT applications (review); and EN ISO 14906:2004 Electronic Fee Collection-Application interface.

A DSRC-compliant GPS unit within the location module 328 is operable to provide GPS data describing the location of the robot 350 with space-level accuracy for accurately directing the robot 350 to a desired location. For example, the robot 350 is moving to a predetermined location and desires partial sensor data. Space-level accuracy means the location of the robot 350 is described by the GPS data sufficient to confirm a location of the robot 350 parking space. That is, the location of the robot 350 is accurately determined with space-level accuracy based on the GPS data from the robot 350.

The communication module 324 may facilitate communications via the transceiver 332. For example, the communication module 324 may be configured to provide communication capabilities via different wireless protocols, such as Wi-Fi, long term evolution (LTE), 3G, etc. The communication module 324 may also communicate with other components of the robot 350 that are not modules of the 3D shape completion system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, 6G, LTE, LTE-V2X, LTE-D2D, VoLTE, or any other mobile data network or combination of mobile data networks. Further, the network access point 360 may include one or more IEEE 802.11 wireless networks.

The multi-object 3D shape completion system 300 also includes the planner module 330 for planning a selected trajectory to perform a route/action (e.g., collision avoidance) of the robot 350 and the controller module 340 to control the locomotion of the robot 350. The controller module 340 may perform the selected action via the locomotion module 326 for autonomous operation of the robot 350 along, for example, a selected route. In one configuration, the planner module 330 and the controller module 340 may collectively override a user input when the user input is expected (e.g., predicted) to cause a collision according to an autonomous level of the robot 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous agents (e.g., Level 0, Level 1, Level 2, Level 3, Level 4, and Level 5). For example, if an autonomous agent has a higher-level number than another autonomous agent (e.g., Level 3 is a higher-level number than Levels 2 or 1), then the autonomous agent with a higher-level number offers a greater combination and quantity of autonomous features relative to the agent with the lower-level number. These distinct levels of autonomous agents are described briefly below.

Level 0: In a Level 0 agent, the set of advanced driver assistance system (ADAS) features installed in an agent provide no agent control but may issue warnings to the driver of the agent. An agent which is Level 0 is not an autonomous or semi-autonomous agent.

Level 1: In a Level 1 agent, the driver is ready to take operation control of the autonomous agent at any time. The set of ADAS features installed in the autonomous agent may provide autonomous features such as: adaptive cruise control (ACC); parking assistance with automated steering; and lane keeping assistance (LKA) type II, in any combination.

Level 2: In a Level 2 agent, the driver is obliged to detect objects and events in the roadway environment and respond if the set of ADAS features installed in the autonomous agent fail to respond properly (based on the driver's subjective judgement). The set of ADAS features installed in the autonomous agent may include accelerating, braking, and steering. In a Level 2 agent, the set of ADAS features installed in the autonomous agent can deactivate immediately upon takeover by the driver.

Level 3: In a Level 3 ADAS agent, within known, limited environments (such as freeways), the driver can safely turn their attention away from operation tasks but must still be prepared to take control of the autonomous agent when needed.

Level 4: In a Level 4 agent, the set of ADAS features installed in the autonomous agent can control the autonomous agent in all but a few environments, such as severe weather. The driver of the Level 4 agent enables the automated system (which is comprised of the set of ADAS features installed in the agent) only when it is safe to do so. When the automated Level 4 agent is enabled, driver attention is not required for the autonomous agent to operate safely and consistent within accepted norms.

Level 5: In a Level 5 agent, other than setting the destination and starting the system, no human intervention is involved. The automated system can drive to any location where it is legal to drive and make its own decision (which may vary based on the district where the agent is located).

A highly autonomous agent (HAA) is an autonomous agent that is Level 3 or higher. Accordingly, in some configurations the robot 350 is one of the following: a Level 0 non-autonomous agent; a Level 1 autonomous agent; a Level 2 autonomous agent; a Level 3 autonomous agent; a Level 4 autonomous agent; a Level 5 autonomous agent; and an HAA.

The perception module 310 may be in communication with the camera module 302, the processor 320, the computer-readable medium 322, the communication module 324, the locomotion module 326, the location module 328, the planner module 330, the transceiver 332, and the controller module 340. In one configuration, the perception module 310 receives sensor data from the camera module 302. The camera module 302 may receive RGB video image data from the first camera 304 and the second camera 306. According to aspects of the present disclosure, the perception module 310 may receive RGB video image data directly from the first camera 304 or the second camera 306 as well as an RGB depth (RGB-D) to manipulate completed 3D object shapes from images captured by the first camera 304 and the second camera 306 of the robot 350. In various aspects of the present disclosure, the planner module 330 and/or the controller module 340 is configured for planning an object grasp by the robot 350 of an object represented by a completed 3D shape, as follows.

As shown in FIG. 3, the perception module 310 includes an unprojection module 312, a 3D MAE encoder module 314, a 3D MAE decoder module 316, and a 3D shape completion module 318. The unprojection module 312, the 3D MAE encoder module 314, the 3D MAE decoder module 316, and the 3D shape completion module 318 may be components of a same or different artificial neural network, such as a convolutional neural network (CNN). The modules (e.g., 312, 314, 316, 318) of the perception module 310 are not limited to a CNN. In operation, the perception module 310 receives a video stream from the first camera 304 and the second camera 306. The video stream may include a 2D RGB left image from the first camera 304 and a 2D RGB right image from the second camera 306 to provide video frame images. The video stream may include multiple frames, such as image frames.

In some aspects of the present disclosure, the perception module 310 is configured for multi-object 3D shape completion in the wild from a single RGB-D image. The perception module 310 includes the unprojection module 312 to unproject an encoded image feature to obtain an octree feature F. Additionally, the perception module 310 includes the 3D MAE encoder module 314 to generate, by a latent 3D MAE encoder using an input encoded octree feature F, an output latent octree feature $F_L$. In various aspects of the present disclosure, the perception module 310 includes the 3D MAE decoder module 316 to compute, by a latent 3D MAE decoder using the output latent octree feature $F_L$ and octree mask tokens T, a latent mixed octree feature $F_{ML}$. Additionally, the perception module 310 includes the 3D shape completion module 318 to predict, using an octree decoder from the latent mixed octree feature $F_{ML}$, a completed 3D shape. The multi-object 3D shape completion in the wild from a single RGB-D image is further illustrated, for example, as shown in FIG. 4.

Figure 4:
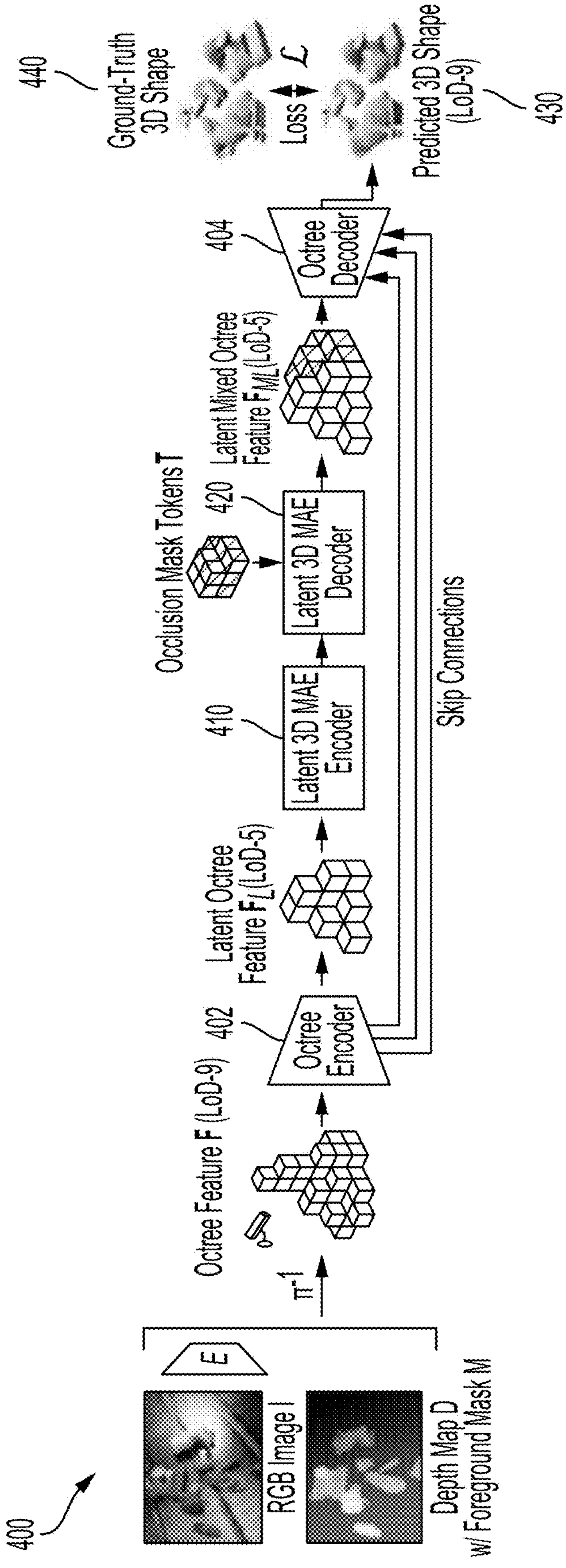
FIG. 4 is a block diagram illustrating a multi-object 3D shape completion pipeline, according to various aspects of the present disclosure.

FIG. 4 provides an overview 400 of a proposed multi-object 3D shape completion process, according to various aspects of the present disclosure. In this example, given an input RGB Image I, depth map D, and a foreground mask M, an octree feature F is obtained by unprojecting an image feature encoded by a pre-trained image encoder E. The octree feature F is then encoded by an octree encoder 402 and downsampled to a level of detail (LoD) of 5 (e.g., a second LoD level) to form a latent octree feature $F_L$. As described, the term LoD-h represents each axis having a resolution of $2^h$.

According to various aspects of the present disclosure, a latent 3D MAE encoder 410 takes the latent octree feature $F_L$ as input and outputs an encoded octree feature F. Next, a latent 3D MAE decoder 420, using the encoded octree feature F and octree mask tokens T, outputs a latent mixed octree feature $F_{ML}$. Finally, an octree decoder 404 predicts a completed surface at LoD-8 (e.g., a first LoD level) from the latent mixed octree feature $F_{ML}$ to form a completed 3D shape 430. Additionally, a loss (L) is shown relative to the completed 3D shape 430 and a ground-truth 3D shape 440. According to various aspects of the present disclosure, predicting, by the octree decoder, provides a completed surface at a first level of detail (LoD) level greater than a second LoD level of the output latent octree feature $F_L$.

1. Proposed Method

Given an RGB image $I \in \mathbb{R}^{H \times W \times 3}$, depth map $D \in \mathbb{R}^{H \times W}$, and foreground mask $M \in \mathbb{R}^{H \times W}$ containing all objects of interest, various aspects of the present disclosure predict complete 3D shapes for the objects of interest quickly and accurately. This section describes a proposed Octree masked encoder (OctMAE)—a hybrid framework of an Octree U-Net and a latent 3D MAE, which can provide high-quality and near real-time multi-object shape completion through both local and global reasoning. This framework first encodes an RGB image I with a pre-trained image encoder E such as ResNext and then lifts the resulting features up to 3D space using a depth map D and foreground mask M to acquire 3D point cloud features $F \in \mathbb{R}^{N \times D}$ and its locations $P \in \mathbb{R}^{N \times 3}$ (Section 1.1). Second, the 3D features are converted into an octree and passed to the OctMAE to predict a surface at each level of detail (LoD) (Section 1.2), for example, as visualized in FIG. 4.

1.1. Octree Feature Aggregation

Various aspects of the present disclosure adopt ResNext-50 as an image encoder to obtain dense and robust image features $W = E(I) \in \mathbb{R}^{H \times W \times D}$ from an RGB image. As shown in FIG. 4, the image features are unprojected into the 3D space using a depth image with $(F,P) = \pi^{-1}(W, D, M, K)$, where a point cloud feature and its corresponding coordinates are represented as F and P. $\pi^{-1}$ unprojects the image features W to the camera coordinate system using a depth map D, foreground mask M, and an intrinsic matrix K. Next, an octree is defined at the level of detail (LoD) of 9 ($512^3$) with the grid and cell size being 1.28 m and 2.5 mm respectively, and the point features are used to populate the voxel grid, averaging features when multiple points fall into the same voxel. As described, LoD-h simply represents resolution of an octree. For instance, the voxel grid of LoD-9 has a maximum dimension of $2^9 = 512$ for each axis. As described, an octree is represented as a set of 8 octants with features at non-empty regions; therefore, it is more memory-efficient than a dense voxel grid. In this example, the octree is centered around the z-axis in the camera coordinate system, and its front plane is aligned with the nearest point to the camera along with the z-axis.

1.2. OctMAE: Octree Masked Autoencoders

Various aspects of the present disclosure design an OctMAE that leverages an Octree U-Net and a latent 3D MAE to achieve accurate and efficient shape completion. In various aspects of the present disclosure, an Octree U-Net is composed of multiple sparse 3D convolutional layers. While the multiple sparse 3D convolutional layers can efficiently encode octree features to low resolution, consideration is limited to local regions that are considered at each operation. On the contrary, 3D MAE can capture global object information which helps predict globally consistent 3D shapes; however, unlike an image, a dense voxel grid contains a prohibitive number of tokens even in the latent space, which makes it challenging to adopt an MAE architecture directly for 3D tasks. Recently, ConvMAE proposed to leverage the advantages of both CNNs and MAE in 2D for efficient training. Nevertheless, a naïve extension of ConvMAE to 3D also leads to prohibitive computational and memory costs.

Figure 5:
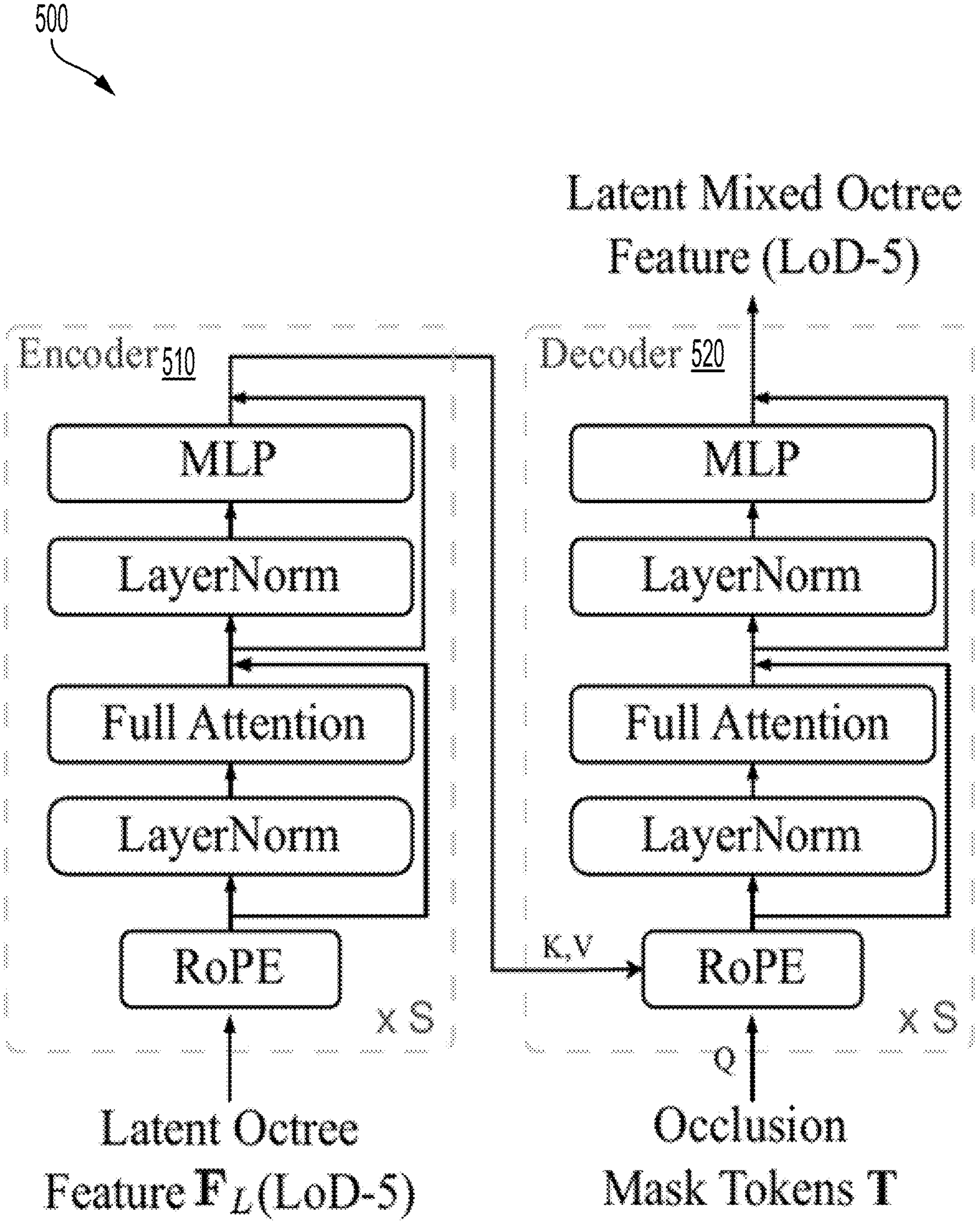
FIG. 5 further illustrates the latent 3D MAE encoder and the latent 3D MAE decoder of FIG. 4, according to various aspects of the present disclosure.

FIG. 5 further illustrates the latent 3D MAE encoder and the latent 3D MAE decoder of FIG. 4, according to various aspects of the present disclosure. As shown in FIG. 5, a latent 3D MAE encoder 510 and a latent 3D MAE decoder 520 of a proposed multi-object 3D shape completion process 500 are configured according to a novel occlusion masking strategy. Additionally, the latent 3D MAE encoder 510 and the latent 3D MAE decoder 520 adopt 3D notary embeddings, enabling efficient masked autoencoding in the latent space, as follows.

Encoder architecture. In various aspects of the present disclosure, an encoder of Octree U-Net takes the octree feature at LoD-9 and computes a latent octree feature $F_L \in \mathbb{R}^{N' \times D'}$ at LoD-5 (a second level of detail (LoD)) where N' is the number of non-empty voxels and D' is the latent feature dimension. To incorporate global symmetric and object scale information which gives more cues about completed shapes, S layers of the full self-attention Transformer blocks are used in the latent 3D MAE encoder 510. Because N' is typically the order of the hundreds to thousands, various aspects of the present disclosure resort to memory-efficient attention algorithms. Ideally, learnable relative positional encodings are used to deal with the different alignments of point cloud features inside an octree. Unfortunately, this involves computing the one-to-one relative positional encoding N'×N' times, which slows down the training and makes it computationally impractical. Therefore, a rotary position embedding (RoPE) is used to encode 3D axial information between voxels. Concretely, position information is embedded with RoPE at every multi-head attention layer as:

$$R_i = \mathrm{diag}(R(p_i^x), R(p_i^y), R(p_i^z), I) \in \mathbb{R}^{D' \times D'},\ f_i' = R_i f_i, \tag{1}$$

where $f_i \in \mathbb{R}^{D'}$ and $p_i \in \mathbb{R}^3$ is i-th octree feature and coordinates. $R: \mathbb{R} \to \mathbb{R} \to \mathbb{R}^{\lfloor D'/3 \rfloor \times \lfloor D'/3 \rfloor}$ is a function to generate a rotation matrix given a normalized 1D axial coordinate. The detailed derivation of R can be found in the supplemental.

Occlusion masking. Next, mask tokens $T \in \mathbb{R}^{M \times D'}$ are concatenated to the encoded latent octree feature where M is the number of the mask tokens. Note that each of the mask tokens has identical learnable parameters. The key question is how to place them in 3D space. Although previous methods put mask tokens inside all the empty cells of a dense voxel grid, it is unlikely that visible regions extending from the camera to the input depth are occupied unless the error of a depth map is enormous. Further, this dense masking strategy forces to use a local attention mechanism such as deformable 3D attention used in VoxFormer, due to the overly expensive memory and computational cost. To address this issue, an occlusion masking strategy is introduced in which the mask tokens T are placed into occluded voxels. Concretely, depth testing is performed on every voxel within a voxel grid to determine if they are positioned behind objects. Mask tokens are assigned to their respective locations only after passing this test. As shown in FIG. 5, the proposed occlusion masking strategy and efficient positional encoding enable the latent 3D MAE encoder 510 to leverage full attention instead of local attention.

Decoder architecture. The masked octree feature is given to the latent 3D MAE decoder 520, which consists of S layers of the full cross-attention transformer blocks with RoPE to learn global reasoning including occluded regions. Finally, the decoder of Octree U-Net takes the mixed latent octree feature of the transformer decoder $F_{ML} \in \mathbb{R}^{(N'+M)\times D'}$ as input and upsamples features with skip connections. The decoded feature is passed to a two-layer MLP which estimates an occupancy at LoD-h. In addition, normals and signed distance function (SDF) values are predicted at the final LoD. To avoid unnecessary computation, grid cells predicted as empty with a threshold of 0.5 at every LoD are pruned.

Figure 6A:
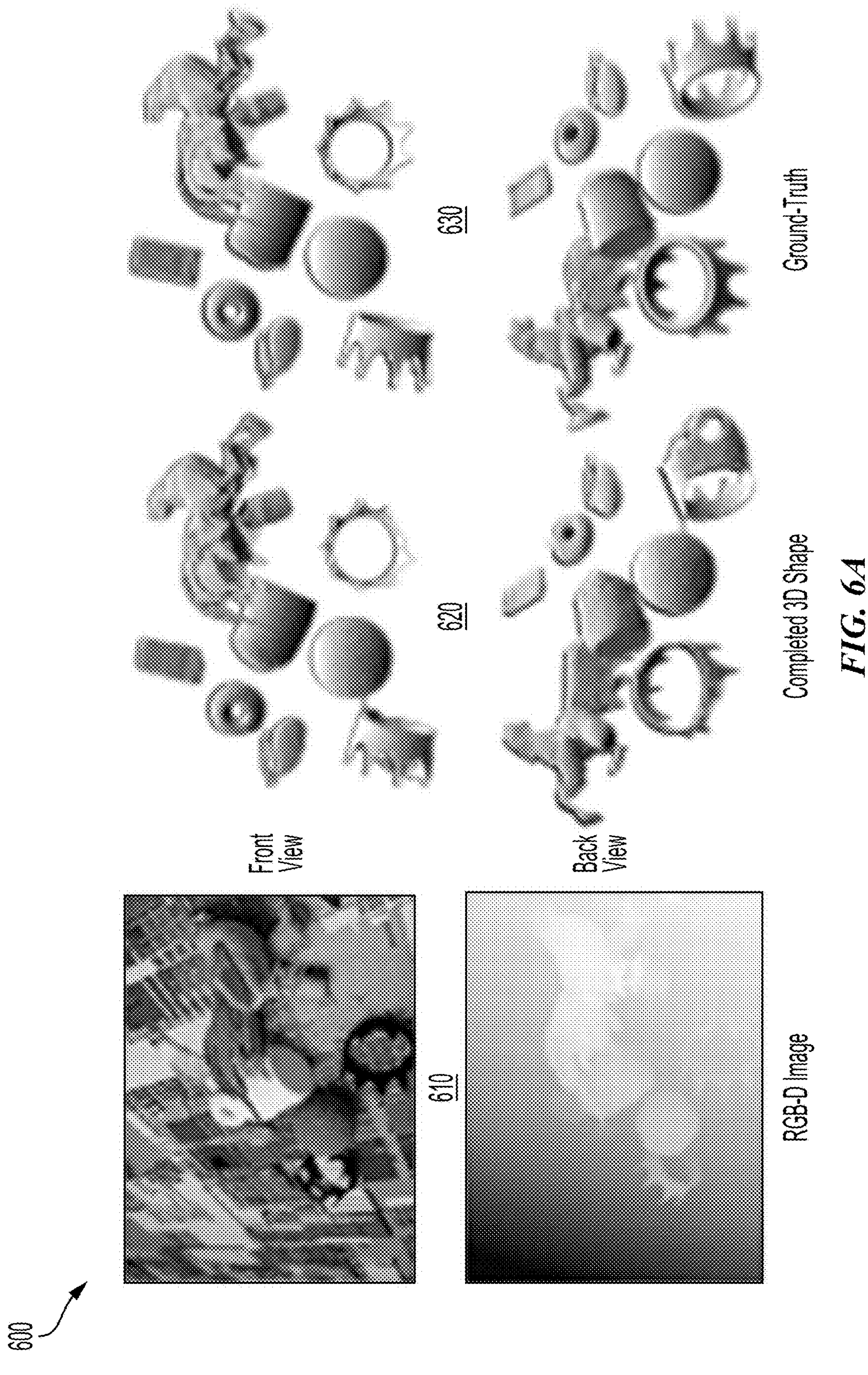
FIGS. 6A and 6B are drawings illustrating a zero-shot multi-object shape completion, according to various aspects of the present disclosure.
Figure 6B:
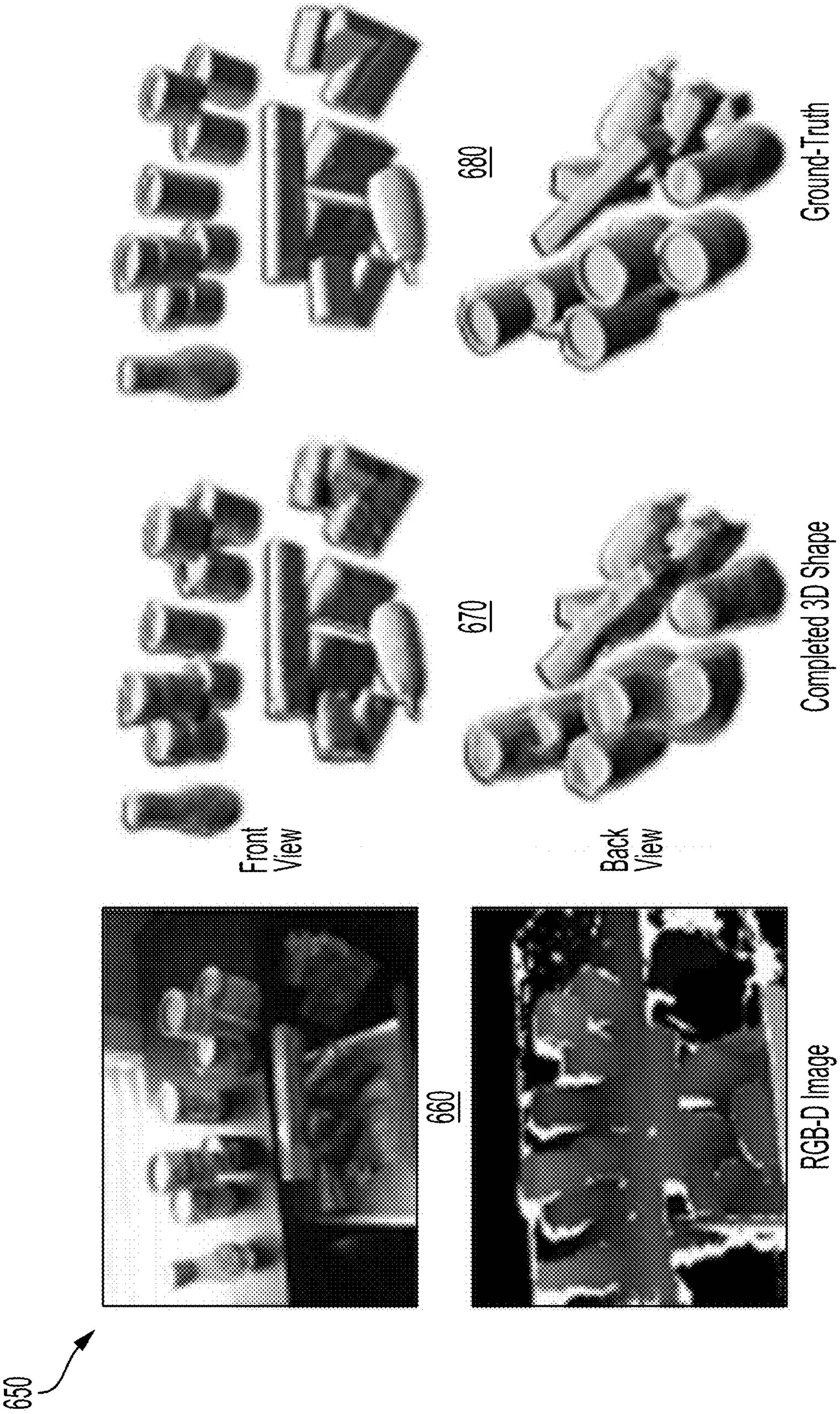

FIGS. 6A and 6B are drawings 600/650 illustrating a zero-shot multi-object shape completion, according to various aspects of the present disclosure. Given an RGB-D image and the foreground mask of multiple objects 610/660 not seen during training, a proposed multi-object 3D shape completion process predicts completed 3D shapes 620/670 quickly and accurately, including occluded areas. In these examples, the completed 3D shapes 620/670 are shown relative to ground-truth 630/680. In this example, FIG. 6A illustrates synthetic image results. Additionally, FIG. 6B illustrates a zero-shot generalization to a real-world image of household objects 660 with noisy depth data. In these examples, the 3D results are rotated with respect to the input to highlight completions in occluded regions.

1.3. Training Details and Loss Functions

All surface points extracted through open virtual database (OpenVDB) during training are used. The loss function is defined as $$\mathcal{L} = \mathcal{L}_{nrm} + \mathcal{L}_{SDF} + \sum_{h\in\{5,6,7,8,9\}} \mathcal{L}_{occ}^{h}, \tag{2}$$

where $\mathcal{L}_{nrm}$ and $\mathcal{L}_{SDF}$ measure the averaged L2 norm of normals and SDF values. $\mathcal{L}$ $$\mathcal{L}_{occ}^{h}$$

computes a mean of binary cross entropy function of each LoD-h.

TABLE 1

Dataset comparisons. A first large-scale and diverse 3D shape completion dataset for novel multiple objects using a subset of 3D models from Objaverse dataset. The number of categories is reported by using the LVIS categories, and $R^{LVIS}$(%) represents a ratio of the number of the categories covered by the dataset.

| Dataset | Type | 3D Models | # Frames | # Objs | # Cats | $R^{LVIS}$(%) |
|---|---|---|---|---|---|---|
| YCB-V | Real | ✓ | 133K | 21 | 5 | 0.4 |
| HB | Real | ✓ | 17K | 33 | 13 | 1.0 |
| HOPE | Real | ✓ | 2K | 28 | 3 | 0.3 |
| CO3D V2 | Real | | 6M | 40K | 50 | 4.2 |
| MegaPose | Synthetic | ✓ | 1M | 1K† | 17 | 0.9 |
| Ours | Synthetic | ✓ | 1M | 12K | 601 | 50.0 |

†denotes the number of objects with actual size.

2. Dataset

Figure 7:
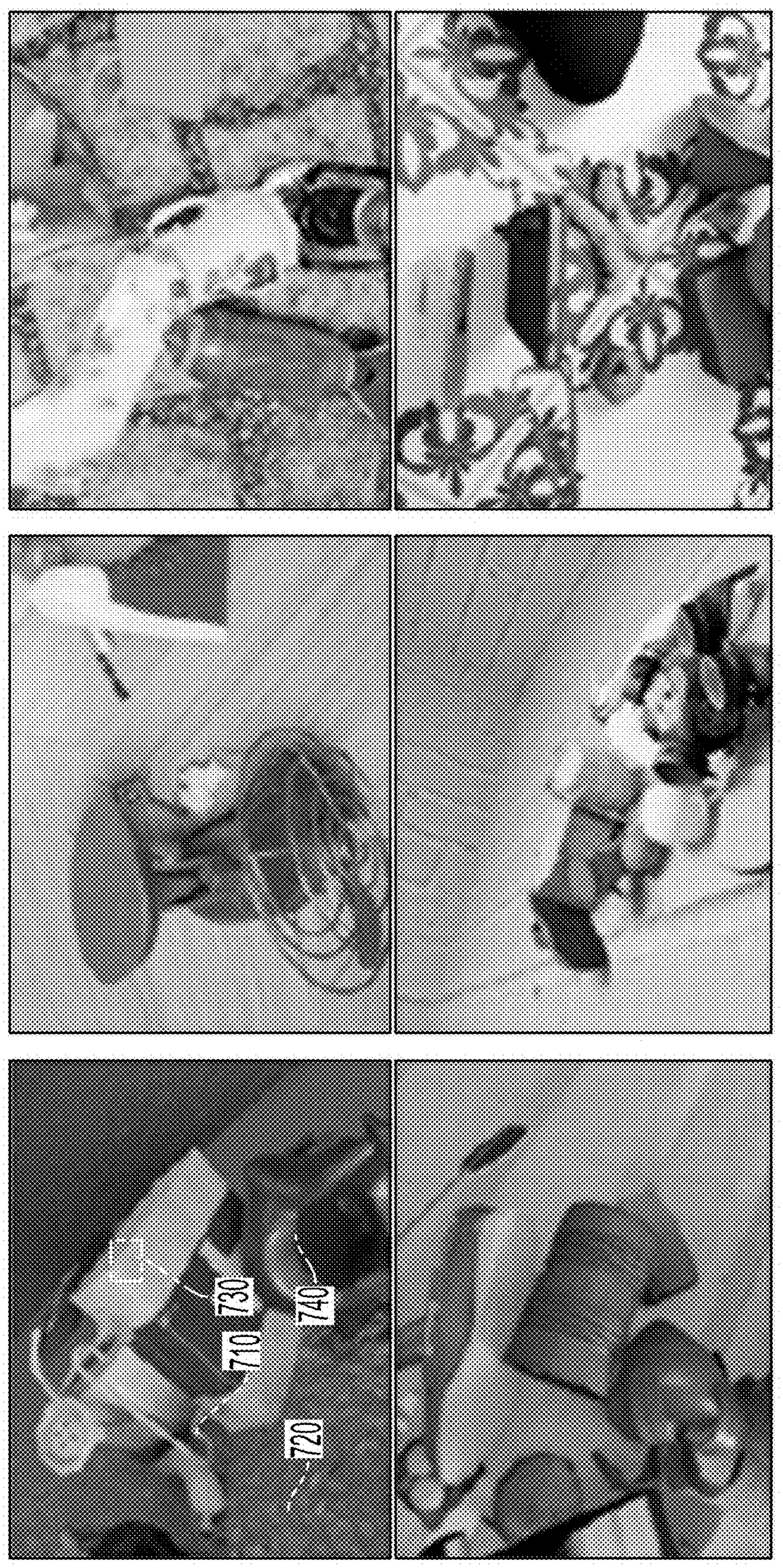
FIG. 7 illustrates example images from a synthetic dataset generated according to various aspects of the present disclosure.

FIG. 7 illustrates example images from a synthetic dataset 700 generated according to various aspects of the present disclosure. As shown in FIG. 7, high-quality images are illustrated under various and realistic illumination conditions.

As shown in Table 1, existing datasets are limited in the diversity of object categories. Although the CO3D V2 dataset contains data for 40 k objects because the provided ground-truth 3D shapes are reconstructed from unposed multi-view images, they tend to be highly noisy and parts of the object missing due to lack of visibility. To tackle this problem, Objaverse, a large-scale 1M 3D object dataset containing 46 k objects with LVIS category annotations is leveraged. To focus on shape completion of handheld objects, 601 categories are selected to ensure that the largest dimension of the objects in each category falls within the range of 4 cm to 40 cm.

In addition, for high-quality rendering, objects that lack textures, contain more than 10,000 vertices, or are articulated, are omitted. To increase the number of objects, objects from Google Scanned Objects (GSO) are added, which results in 12,655 objects in total. 1M images of 25,000 scenes are rendered using physics-based rendering and positioning to simulate the realistic scenes shown in FIG. 7. For each image shown in FIG. 7, a camera view is randomly chosen, such that at least one object is within the camera frame. For example, 1,000 images using 250 withheld objects for evaluation are generated. A process for completing 3D object shapes in the wild is further illustrated in FIG. 8.

Figure 8:
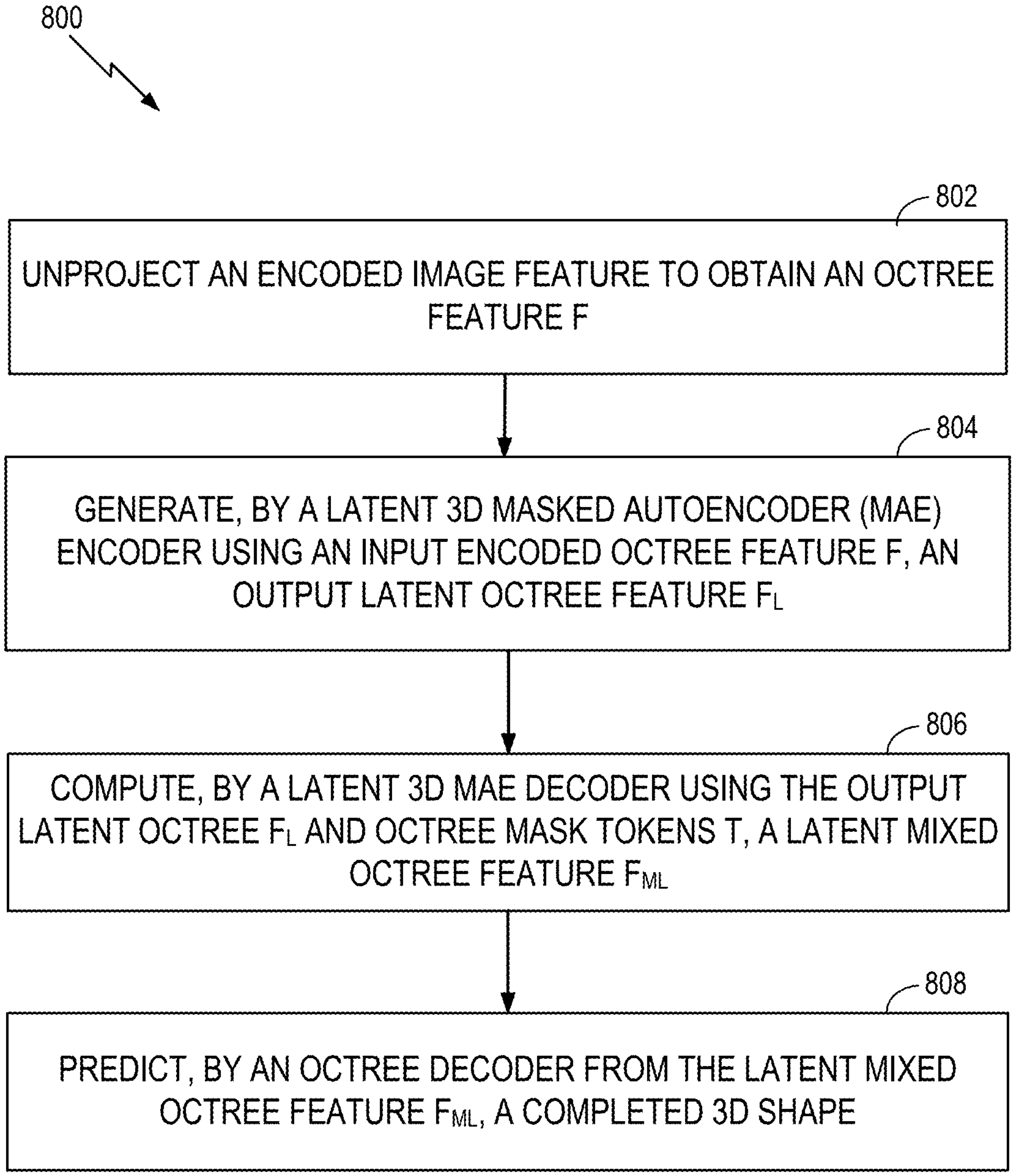
FIG. 8 is a flowchart illustrating a method for multi-object 3D shape completion, according to aspects of the present disclosure.

FIG. 8 is a flowchart illustrating a method for multi-object 3D shape completion, according to aspects of the present disclosure. A method 800 begins at block 802, in which an encoded image feature is unprojected to obtain an octree feature F. For example, as shown in FIG. 4, given an input RGB Image I, depth map D, and a foreground mask M, an octree feature F is obtained by unprojecting an image feature encoded by a pre-trained image encoder E. At block 804, a latent 3D masked autoencoder (MAE) encoder generates an output latent octree feature $F_L$, using an input encoded octree feature F. For example, as shown in FIG. 4, the octree feature F is then encoded by an octree encoder 402 and down-sampled to a level of detail (LoD) of 5 (e.g., a second LoD level) to form a latent octree feature $F_L$. As described, the term LoD-h represents each axis having a resolution of $2^h$.

At block 806, a latent 3D MAE decoder computes a latent mixed octree feature $F_{ML}$ using the output latent octree $F_L$ and octree mask tokens T. For example, as shown in FIG. 4, a latent 3D MAE encoder 410 takes the latent octree feature $F_L$ as input and outputs an encoded octree feature F. Next, a latent 3D MAE decoder 420, using the encoded octree feature F and octree mask tokens T, outputs a latent mixed octree feature $F_{ML}$.

At block 808, an octree decoder predicts a completed 3D shape from the latent mixed octree feature $F_{ML}$. For example, as shown in FIG. 4, an octree decoder 404 predicts a completed surface at LoD-8 (e.g., a first LoD level) from the latent mixed octree feature $F_{ML}$ to form a completed 3D shape 430. Additionally, a loss (L) is shown relative to the completed 3D shape 430 and a ground-truth 3D shape 440. According to various aspects of the present disclosure, predicting, by the octree decoder, provides a completed surface at a first level of detail (LoD) level greater than a second LoD level of the output latent octree feature $F_L$.

In some aspects of the present disclosure, the method 800 may be performed by the SOC 100 (FIG. 1) or the software architecture 200 (FIG. 2) of the robot 150 (FIG. 1). That is, each of the elements of method 800 may, for example, but without limitation, be performed by the SOC 100, the software architecture 200, or the processor (e.g., CPU 102) and/or other components included therein of the robot 150.

Various aspects of the present disclosure describe a 3D shape completion method that recovers the complete geometry of multiple objects in complex scenes from a single RGB-D image. Despite notable advancements in single object 3D shape completion, high-quality reconstructions in cluttered multi-object scenes remains a challenge. Various aspects of the present disclosure propose solutions involving a novel architecture that uses Sparse 3D Convolution Transformers, which can effectively exploit the sparse and incomplete nature of input data of the present disclosure. Additionally, a masked autoencoder (MAE) scheme is designed to leverage occlusion derived from the input depth to compute enhanced geometry-aware features combined with image-level semantic features. A self-attention mechanism aggregates the sparse information while effectively preserving the global scene context and allows for efficient and accurate shape completion. To generalize to a wide range of objects in diverse scenes, various aspects of the present disclosure create a large-scale photorealistic synthetic dataset, featuring a diverse set of 12K 3D object models from a selected dataset that are rendered in complex, multi-object scenes. This proposed method demonstrates improved performance over the current state-of-the-art on the proposed synthetic reconstruction benchmark and when using real-world data.

The various operations of methods described above may be performed by any suitable means capable of performing the corresponding functions. The means may include various hardware and/or software component(s) and/or module (s), including, but not limited to, a circuit, an application-specific integrated circuit (ASIC), or processor. Where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits, such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such with cache and/or specialized register files. Although the various components discussed may be described as having a specific location, such as a local component, they may also be configured in numerous ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic or graphics processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more PGAs, PLDs, controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the application and the overall design constraints imposed on the overall system.

The machine-readable media may comprise several software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for 3D object shape completion, the method comprising:

unprojecting an encoded image feature to obtain an octree feature F;

generating, by a latent 3D masked autoencoder (MAE) encoder using an input encoded octree feature F, an output latent octree feature $F_L$;

downsampling an output of the latent 3D MAE encoder to form the output latent octree feature $F_L$ at a second level of detail (LoD) level;

computing, by a latent 3D MAE decoder using the output latent octree $F_L$ and octree mask tokens T, a latent mixed octree feature $F_{ML}$; and predicting, by an octree decoder from the latent mixed octree feature $F_{ML}$, a completed 3D shape comprising a completed surface at a first LoD level greater than the second LoD level of the output latent octree feature $F_L$.

2. The method of claim 1, in which the unprojecting further comprises encoding, using by a pre-trained image encoder E, an image feature from an input RGB Image I using a depth map D and a foreground mask M to form the encoded image feature.

3. The method of claim 1, in which the completed surface is occluded in an input RGB Image I.

4. The method of claim 1, in which an LoD-h represents each axis having a resolution equal to $2^h$.

5. The method of claim 1, further comprising encoding the input encoded octree feature F using an octree encoder to form the input encoded octree feature F.

6. The method of claim 1, further comprising planning an object grasp by a robot of an object represented by the completed 3D shape.

7. A non-transitory computer-readable medium having program code recorded thereon for 3D object shape completion, the program code being executed by a processor and comprising:

- program code to unproject an encoded image feature to obtain an octree feature F;
- program code to generate, by a latent 3D masked autoencoder (MAE) encoder using an input encoded octree feature F, an output latent octree feature $F_L$;
- program code to downsample an output of the latent 3D MAE encoder to form the output latent octree feature $F_L$ at a second level of detail (LoD) level;
- program code to compute, by a latent 3D MAE decoder using the output latent octree $F_L$ and octree mask tokens T, a latent mixed octree feature $F_{ML}$; and
- program code to predict, by an octree decoder from the latent mixed octree feature $F_{ML}$, a completed 3D shape, comprising a completed surface at a first LoD level greater than the second LoD level of the output latent octree feature $F_L$.

8. The non-transitory computer-readable medium of claim 7, in which the program code to unproject further comprises program code to encode, using by a pre-trained image encoder E, an image feature from an input RGB Image I using a depth map D and a foreground mask M to form the encoded image feature.

9. The non-transitory computer-readable medium of claim 7, in which the completed surface is occluded in an input RGB Image I.

10. The non-transitory computer-readable medium of claim 7, in which an LoD-h represents each axis having a resolution equal to $2^h$.

11. The non-transitory computer-readable medium of claim 7, further comprising program code to encode the input encoded octree feature F using an octree encoder to form the input encoded octree feature F.

12. The non-transitory computer-readable medium of claim 7, further comprising program code to plan an object grasp by a robot of an object represented by the completed 3D shape.

13. A system for 3D object shape completion, the system comprising:

- an unprojection module to unproject an encoded image feature to obtain an octree feature F;
- a latent 3D masked autoencoder (MAE) encoder to generate, using an input encoded octree feature F, an output latent octree feature $F_L$ and to downsample an output of the latent 3D MAE encoder to form the output latent octree feature $F_L$ at a second level of detail (LoD) level;
- a latent 3D MAE decoder to compute, using the output latent octree $F_L$ and octree mask tokens T, a latent mixed octree feature $F_{ML}$; and
- an octree decoder to predict, from the latent mixed octree feature $F_{ML}$, a completed 3D shape, comprising a completed surface at a first LoD level greater than the second LoD level of the output latent octree feature $F_L$.

14. The system of claim 13, in which the unprojection module is further to encode, using by a pre-trained image encoder E, an image feature from an input RGB Image I using a depth map D and a foreground mask M to form the encoded image feature.

* * * * *